June 3, 1930. W. GEBHARDT 1,761,823
NUT CRACKING MACHINE
Filed April 11, 1928 4 Sheets-Sheet 1
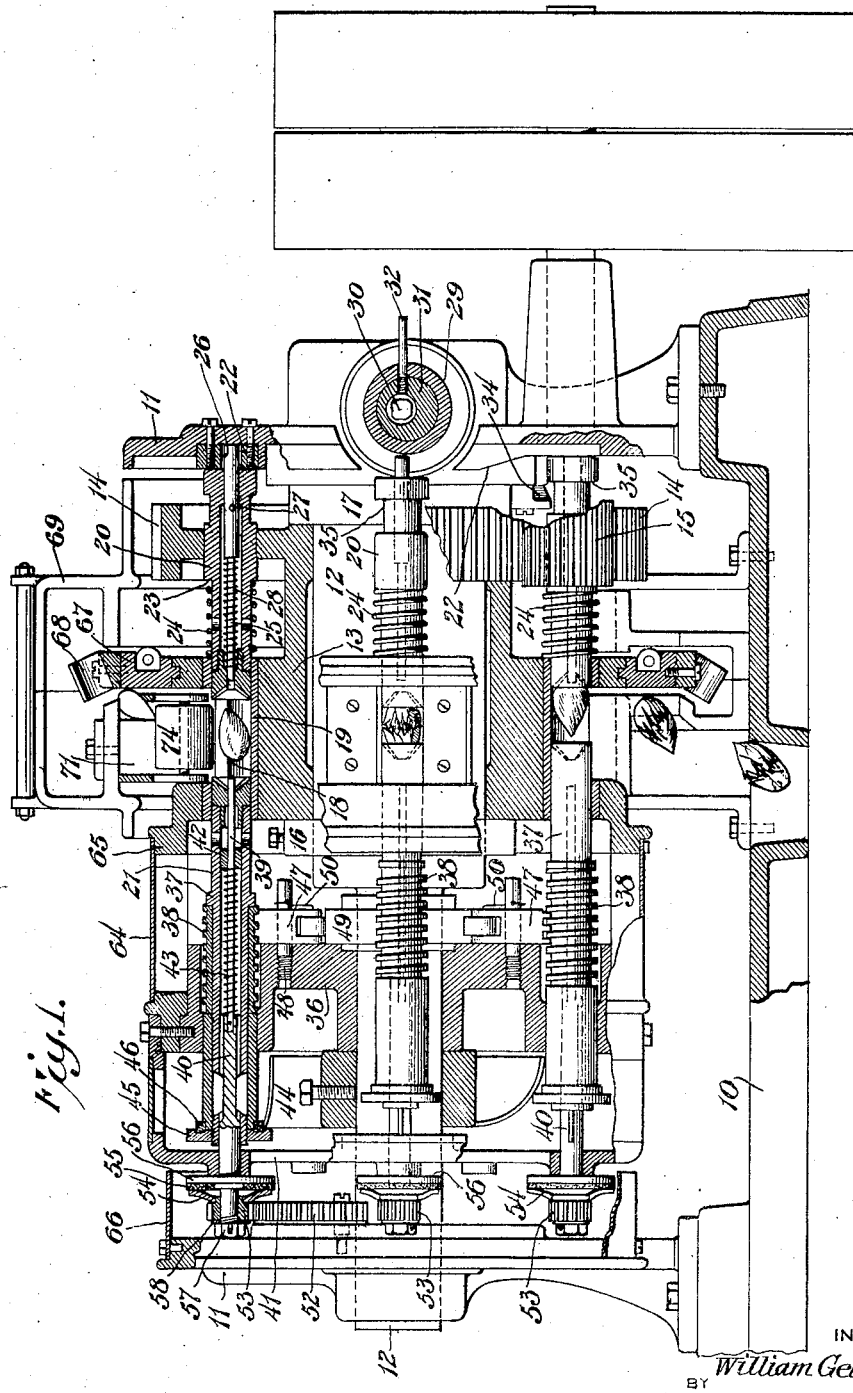
INVENTOR
William Gebhardt,
BY
Siggers & Adams.
ATTORNEYS June 3, 1930.  W. GEBHARDT  1,761,823
NUT CRACKING MACHINE
Filed April 11, 1928  4 Sheets-Sheet 2
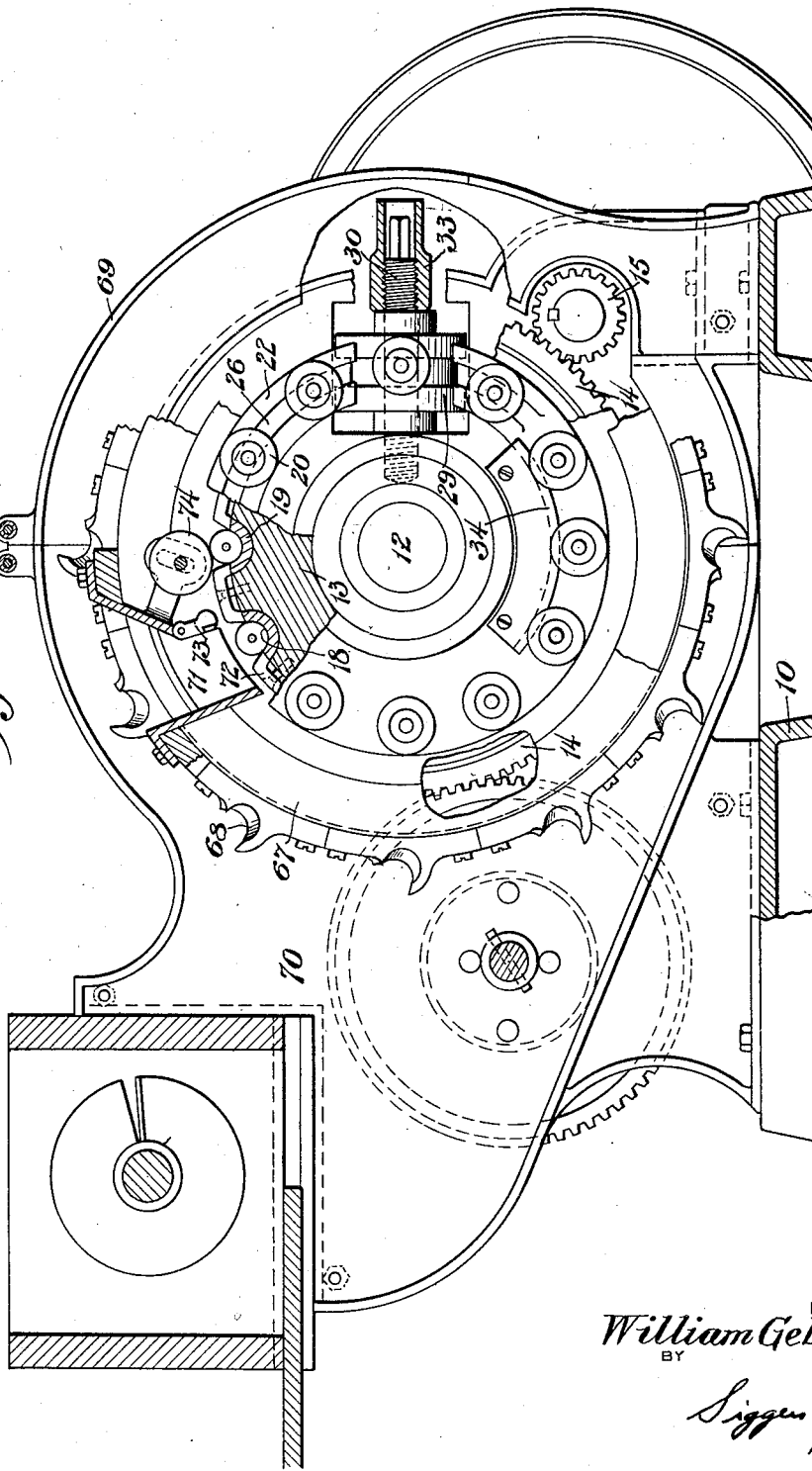
INVENTOR
William Gebhardt
BY
Siggers & Adams
ATTORNEYS

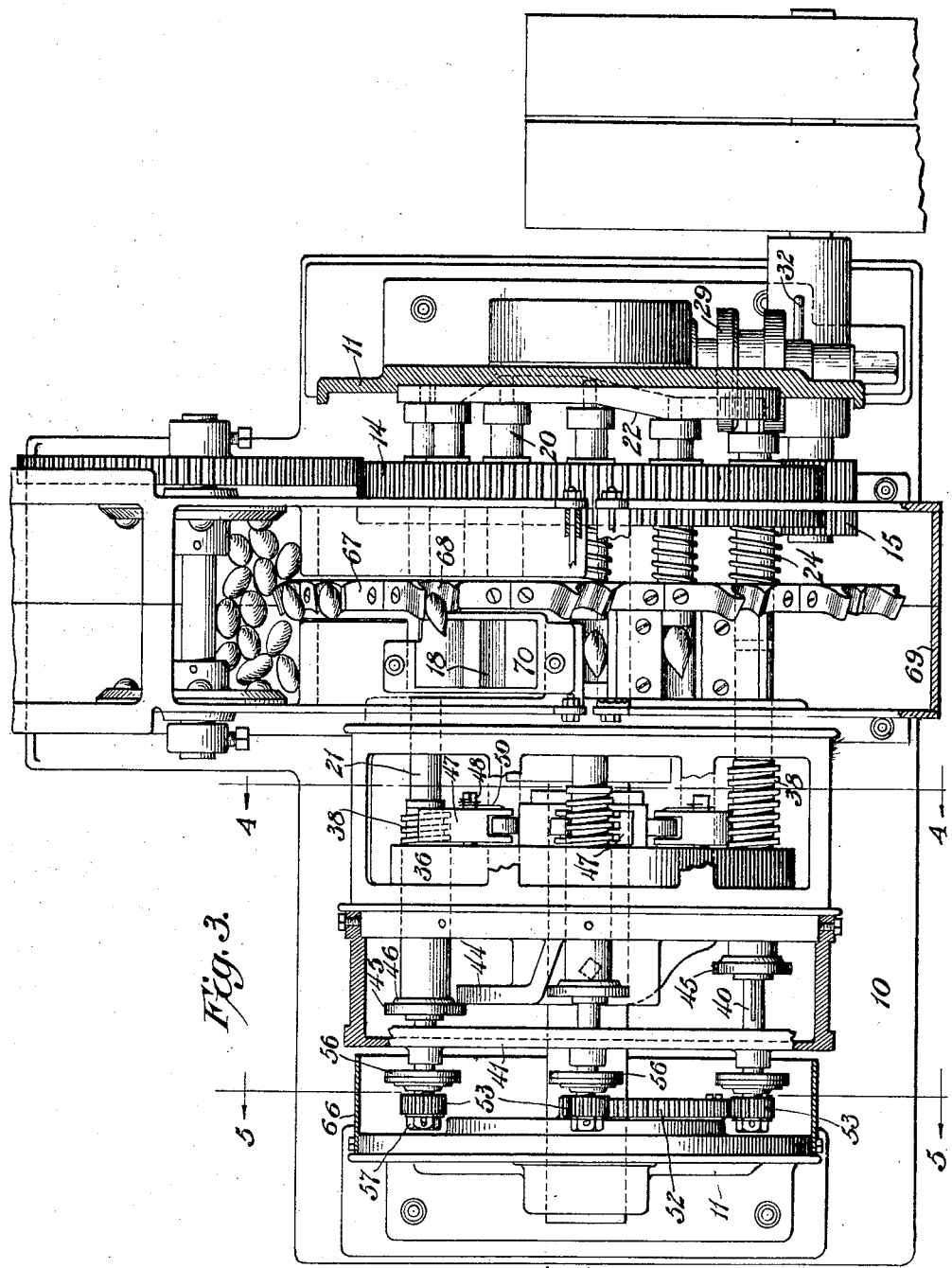

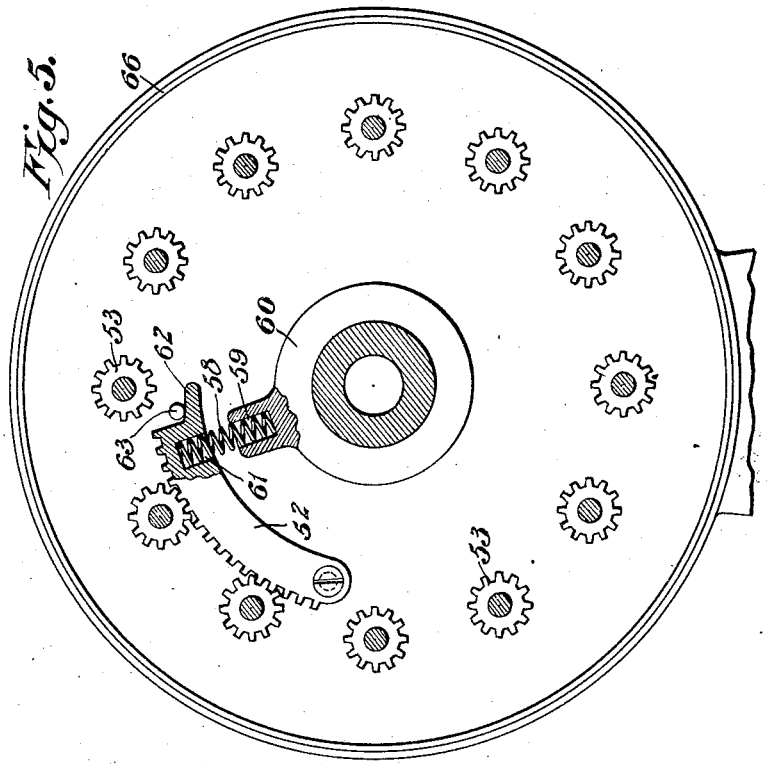
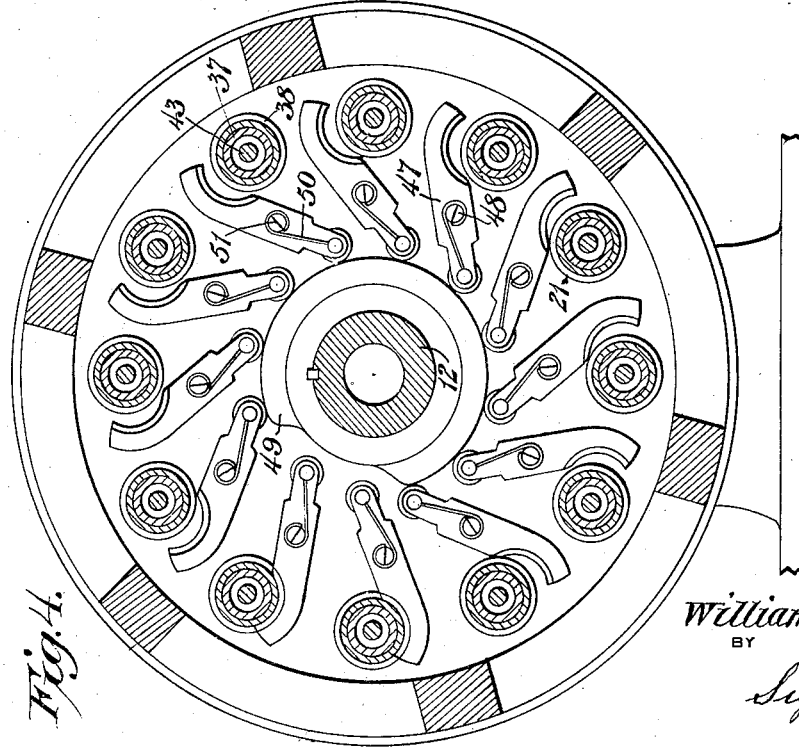

Patented June 3, 1930

1,761,823

UNITED STATES PATENT OFFICE

WILLIAM GEBHARDT, OF SAN ANTONIO, TEXAS, ASSIGNOR TO G. A. DUERLER MANUFACTURING COMPANY, OF SAN ANTONIO, TEXAS, A CORPORATION OF TEXAS

NUT-CRACKING MACHINE

Application filed April 11, 1928. Serial No. 269,175.

This invention relates to nut cracking machines and aims, among other objects, to provide an improved automatic machine of the rotary drum or carrier type capable of being driven at relatively high speeds and having improved operating mechanism associated with the plungers to insure proper gripping of the nuts with uniform pressure before they are fractured so that a greater percentage of good halves which command the highest market prices, will be produced.

Referring to the illustrative embodiment of the invention shown in the accompanying drawings:—

Fig. 1 is a central longitudinal sectional view partly in elevation, of a machine embodying the improvements;

Fig. 2 is a transverse sectional view taken on the line 2—2 of Fig. 1, parts being shown broken away and parts being shown in elevation;

Fig. 3 is a top plan view of the machine shown in Fig. 1, parts being broken away and other parts being shown in section;

Fig. 4 is a cross sectional view taken on the line 4—4 of Fig. 3, and

Fig. 5 is a sectional view taken on the line 5—5 of Fig. 3.

Referring particularly to the drawings, there is shown a machine which embodies many of the features shown in my prior Patent No. 1,133,121, granted March 23, 1915, wherein a rotatable drum has nut receiving pockets for opposed pairs of nut cracking plungers adapted to be operated by cams and gearing. The improvements herein shown relate largely to the mechanism for controlling the operation of the plungers to produce perfectly cracked nuts when the machine is operated at a much greater speed.

In the present instance, there is shown herein a base 10 on the opposite ends of which are mounted supports or standards 11 carrying a stationary shaft 12 on which the nut cracking mechanism is rotatably mounted. On the shaft 12 is a nut carrier or drum 13 adapted to be rotated by means of an integral gear 14 meshing with a driving pinion 15 (see Figs. 1 and 2). In the periphery of the drum 13, which is confined to rotate between a stationary collar 16 and a shoulder 17 on the stationary shaft there is shown a plurality of transverse nut receiving pockets 18 having slotted bronze bushings 19 therein within which pairs of cracking plungers 20 and 21 are adapted to be reciprocated by means later to be described. The mechanism thus far described is much the same as that shown in my prior patent and, hence, does not require detailed description.

The nut cracking plungers 20 and 21 of which there may be any number depending upon the desired capacity of the machine, are adapted to be rotated with the drum and function first to grip the individual nuts supplied to the pockets, second, to fracture them and, third, to eject them from the pockets. Herein, the plungers 20 are substantially tubular throughout a greater portion of their length and are mounted to reciprocate within openings through the gear 14 aligned with the respective bushings 19. The outer ends of these plungers contact with a substantially ring-shaped cam member 22, similar to that shown in my prior patent, to control the movements of the cracking plungers. Between the side face of the drum 13 and a shoulder 23 on each plunger, is a compression spring 24 normally to hold the plunger in engagement with the cam. Within the plunger is an ejector pin 25 projecting through the outer end of the plunger into a slot or groove 26 in the cam ring. This pin has a stop pin in 27 within the tubular portion of the plunger 20 and is shown as having a reduced end portion extending into a central opening in the hammer end. Between the hammer end of the plunger which is preferably screw threaded into the tube and the shoulder on the ejector pin is a small compression spring 28 adapted to hold it normally retracted as shown in Fig. 1.

Cooperating with the cracking plungers 20 is a grooved cracking wheel 29 adapted to be adjusted on a screw threaded stud 30 on which is mounted an eccentric bushing 31 and this bushing has a pin 32, the arrangement being such that the cracking wheel can be adjusted and locked by means of a locking sleeve nut 33 on the threaded end of the stud thereby adjusting the stroke of the cracking or hammer plungers. This adjustment is made by holding the pin 32 in a certain position, while tightening the sleeve nut 33 with a wrench. The angular position of the pin indicates at a glance the amount of crack given. If desired a suitable graduated scale (not shown) may be placed behind the pin.

The plungers will be retracted by means of the compression springs 24 after they have rotated past the cracking wheel, while the ejector pins will be pushed through the central openings in the hammer faces to eject the cracked nuts and cause the nuts to fall out of the machine at the bottom (see Fig. 1). If however, the plungers should become clogged with nut shells, they will be positively retracted by an auxiliary retracting cam 34 attached to the face of the bracket, shown at the right in Figs. 1 and 2, which has a plunger engageable with cam grooves 35 adjacent to the ends of the plungers.

The plungers 21 which will be referred to herein as the gripping and anvil plungers are shown as being journaled to rotate and reciprocate in the opposite ends of the bushings 19 and in a web member 36 which also rotates with the drum 13. In Fig. 1, each of these plungers is shown as comprising a tubular shell 37 on which is mounted an external screw threaded sleeve 38 projecting through the opening in the web member 36. Within the tubular shell 37 is mounted an ejector pin 39, which is adapted to project through an opening in the anvil portion of the plunger when the plunger is retracted as shown at the top of Fig. 1. This pin is shown as being connected at its other end to a shaft 40 of larger diameter which extends through the end of the shell and is journaled in a second web member 41 and which is milled as shown in Fig. 1, providing a slidable guide-way or spline connection for the sleeve 38. Between the inner end of the shaft 40 and a fixed abutment 42 in the inner end of the plunger shell is an expansion spring 43 normally urging the plunger to the right in Fig. 1 so that it will engage the end of a nut fed in one of the pockets.

To control the movement of the anvil plungers, there is shown a stationary cam 44 adapted to be secured to the fixed shaft 12 and engageable with a flanged member 45 on the outer ends of each of the plungers. This arrangement provides for withdrawing or retracting the plungers at the proper times and releasing them so that the anvils will be forced into engagement with the nuts after they are received in the pockets.

In Fig. 1 each plunger is shown as having a washer constituting a ring bumper 46 conveniently inserted in a groove in the flange 45 about a reduced end of the sleeve 37. This bumper is adapted to break or cushion the blow when the anvil plunger strikes the wall or face of the web 36 in case the nut pocket is void of a nut or the machine is runnig empty. This bumper may be a hardened split steel washer or some soft material such as rubber or leather.

To insure that the nuts will be gripped properly and with a uniform pressure, there is shown a series of latch dogs 47, (Fig. 4), one for each plunger, adapted to be brought into engagement with the threaded portions of the sleeve 38. Herein, each of the dogs is pivotally mounted intermediate its ends on a pintle or pin 48 screw threaded into the web member 36 and the inner end contacts with the face of a fixed cam 49 also on the shaft 12, the arrangement being such that when the anti-friction rollers engage the high part of the cam as shown in Fig. 4, the dogs are held out of engagement with the screw threaded sleeves and when the cam releases them they are snapped into engagement or meshed with the threads, as shown at the left hand side of Fig. 4, by means of wire springs 50 wound about the pins 47 and inserted in slots 51 (Fig. 4).

The outer ends of the shafts 40 are adapted to be driven by a friction clutch driving mechanism including a curved rack member 52 pivoted to the inner face of the left hand supporting standard 11 and arranged to mesh with pinions 53 loosely mounted on the ends of the shafts. The clutch connection for each shaft includes a friction spring disk 54 secured to the hub of the pinion cooperating with a fiber washer 55 loosely mounted on the end of the shaft and contacting with a metal washer 56 fixed on the shaft. The pinion 53 is adapted to be locked on the shaft by means of a castellated nut 57 which compresses it against the outer face of thrust collar 58 to adjust or vary the compression of the spring disk. The adjustment is made so that the spring member or clutch connection will slip after the nuts have been gripped with the proper or desired pressure. When the sleeve 38 is thus rotated, the corresponding latch dog will be engaged with the threaded end thereof and will afford an abutment for the plunger during the cracking operation.

If the teeth on the rack member 52 should not engage or mesh properly with the teeth on the pinions 53 the rack will be kicked inwardly against the compression of a coil spring 58 (Fig. 5) seated at one end in a pocket 59 in a fixed member 60 secured to the shaft 12 adjacent to the inner face of the standard 11 and, at the other end, in an opening 61 in the free end of the rack. In Fig. 5, the rack is shown as having an end projection 62 adapted to engage the stop pin 63 to hold the end of the rack in proper pinion engaging position.

All of the mechanism for operating the anvil plungers, just described, is preferably housed within a drum-like sectional casing 64 to protect them from the dust and other foreign matter. Herein, referring to Fig. 1, the sections are shown as being connected to the webs 36 and 41 and a flange 65 on the cracking drum. Also, there is shown a cylindrical sheet metal flange 66 secured to the inner face of the standard 11 to house the clutch driving mechanism.

To permit dust to escape from the tubular plungers 20 and 21 and thereby prevent them from becoming sluggish or clogged, they are shown in Fig. 1 as having holes bored through them adjacent to their inner ends so that the dust which works through the holes in the jaws can escape or be worked out by the movement of the ejecting pins and the plungers. Otherwise, the dust would accumulate and eventually form a pasty mass by mixing with nut oil and lubricating oil and this would harden.

Inasmuch as the mechanism shown for feeding nuts to the machine has been made the subject of a separate copending application, it requires no detailed description. Also, it is obvious that any suitable feeder may be used. However, I prefer to use a feed wheel 67 mounted on the drum and having detachable pick-up spoons 68 secured to its rim so arranged within a sectional casing 69 that each spoon will pick up a single nut from the hopper 70 and deliver it at the proper time to a chute 71. The nuts fall on bridge members 72 between the pockets or sleeves and are made to lie perfectly within the pockets by a trap door or gate 71 and a loosely journaled roller 74 associated with the rear wall of the chute.

As soon as each pocket 18, with a nut therein passes under the roller 74, a hammer plunger is pushed out to a position as shown in Fig. 1. A moment later an anvil plunger is released by its cam 44 and is pressed inwardly by the spring 43 almost with a snap action or a blow initially to grip the nut. The plunger shaft is now rotated by the rack and pinion driving mechanism through the clutch and after a few rotations during which the nut is properly centered, one of the latch dogs 47 is released by its cam 49 to engage the threads on the sleeve 38. Inasmuch as the jaws have teeth and the pointed ends of pecans do not always find the center of the jaws, this preliminary turning movement of the jaws before the dogs engage the threaded sleeves is very necessary in order to insure proper centering. Further rotation of the anvil plunger after the dog engages the threaded sleeve, advances the plunger positively until the gripping pressure is sufficient to make the clutch slip.

That is to say, the fiber washer 55 will slip on the surface of the metal washer. The pinion 53 will then run off the rack 52 and the plunger will stop rotating, being held gripped against the nut by the latch dog 47 until the hammer plunger 20 passes the cracking wheel or cam 29 and fractures the nut. Then the various described cams cooperate to retract the plungers so that the ejector pins function to dislodge the nut shells from the nut engaging faces, whereby they are ejected from the machine through a chute in the base (Fig. 1). Thus, the cycle of operations is repeated.

From the foregoing description, it will be seen that this improved machine is capable of being driven at a relatively high speed; that the anvil plungers are adapted to grip the nuts with a uniform pressure which may be changed to suit the character of the nuts; that the stroke of the cracking or hammer plungers may be adjusted to give a uniform fracture so that more perfect halves are procured; and that the machine can be used for cracking nuts of different grades or sizes.

Obviously, the present invention is not restricted to the particular embodiment thereof herein shown and described. Moreover, it is not indispensable that all of the features of the invention be used conjointly, since they may be employed advantageously in various combinations and sub-combinations.

What is claimed is:

1. In a nut cracking machine of the rotary drum type, a plurality of coacting pairs of anvil and hammer plungers; means for actuating said plungers initially to grip the nuts; and an eccentrically mounted, adjustable cracking wheel in the paths of said hammer plungers to cause them to fracture the gripped nuts.

2. In a nut cracking machine of the rotary drum type, a plurality of coacting pairs of anvil and hammer plungers; means for actuating said plungers initially to grip the nuts; an eccentric cracking wheel in the path of the ends of said cracking plungers; and means to adjust the wheel whereby to vary the stroke of the plungers.

3. In a nut cracking machine of the rotary drum type, a plurality of coacting pairs of anvil and hammer plungers; means for actuating said plungers initially to grip the nuts; the actuating means for the hammer plungers including a ring cam at the ends thereof; an eccentric cracking wheel adjustably mounted also in the path of the ends of the hammer plungers; a threaded shaft carrying the cracking wheel; a bushing between the shaft and cracking wheel; a lock nut to hold the bushing in adjusted position; and a set screw rod for securing the bushing and wheel against rotation on the shaft whereby the stroke of the hammer plungers may be varied.

4. In a nut cracking machine of the rotary drum type, a plurality of coacting pairs of anvil and hammer plungers; means for actuating said plungers initially to grip the nuts; an adjustably mounted cracking wheel in the path of the ends of the cracking plungers; and means to lock the wheel in adjusted positions.

5. In a nut cracking machine of the rotary drum type, a plurality of coacting pairs of anvil and hammer plungers means for actuating said plungers initially to grip the nuts and then to crack them during the rotation of the drum; springs normally to retract the hammer plungers; said hammer plungers having annular grooves near their outer ends; and an auxiliary cam engageable with the outer faces of the grooves positively to retract the hammer plungers when they are choked and the springs fail to function.

6. In a nut cracking machine of the rotary drum type, coacting pairs of hammer and anvil plungers; and friction driving mechanism associated with one set of said plungers arranged to grip the nuts with uniform pressure before they are cracked.

7. In a nut cracking machine of the rotary drum type, coacting pairs of hammer and anvil plungers; and means for actuating the anvil plungers to grip the nuts including friction clutches and periodically driven screw means so arranged as to grip the nuts with uniform pressure.

8. In a nut cracking machine of the rotary drum type, coacting pairs of hammer and anvil plungers; and means for actuating the anvil plungers to grip the nuts including friction clutches and periodically driven screw means so arranged as to grip the nuts with uniform pressure, said friction clutches being adjustable to vary the gripping pressure according to the character of the nuts.

9. In a nut cracking machine of the rotary drum type, coacting pairs of hammer and anvil plungers; means for rotating the anvil plungers including an arcuate rack; pinions rotatably mounted on plunger drive shafts and engageable with the rack; friction driving means between the pinions and said plunger shafts; and screw means associated with the plungers to advance them and grip the nuts with a uniform pressure.

10. In a nut cracking machine of the rotary drum type, coacting pairs of hammer and anvil plungers; means for rotating the anvil plungers including an arcuate rack; pinions rotatably mounted on the plunger drive shafts and engageable with the rack; friction spring disks carried by the pinions; friction washers on the plungers driving shafts and yieldably engaging said friction disks; and screw means associated with the plungers to advance them and grip the nuts with a uniform pressure.

11. In a nut cracking machine of the rotary drum type, coacting pairs of hammer and anvil plungers; said anvil plungers being rotatable about their axes; shafts projecting through the outer ends thereof on which the plungers are slidably but non-rotatably mounted; pinions freely rotatable on the ends of said shaft; spring clutch disks on the pinions and friction clutch elements fixed on the shafts; castellated nuts engaging the pinions for adjusting the clutch elements; an arcuate pivoted rack engageable with the pinions as they pass it in their rotation; screw threads on the hammer plungers; latch dogs engageable with the screw threads when the plungers are being rotated to advance the plungers; and separate stationary cams for retracting the plungers and actuating the latch dogs in proper timed relation.

12. In a nut cracking machine of the rotary drum type, coacting pairs of hammer and anvil plungers; means for rotating the anvil plungers including an arcuate rack; pinions rotatably mounted on plunger drive shafts and engageable with the rack; friction driving means between the pinions and said plunger shafts; screw threaded sleeves on the plungers; latch dogs engageable with the sleeves; and cam means for actuating the latch dogs whereby they engage the screw threads to advance the plungers and cause them to grip the nuts with uniform pressure.

13. In a nut cracking machine of the rotary drum type, coacting pairs of hammer and anvil plungers; cam means for actuating the hammer plungers; means for periodically rotating the anvil plungers; said plungers being slidably mounted on the driving means; screw threaded members on the plungers; pivoted latch dogs engageable with the screw threaded members to advance the plungers as they rotate; and a cam to actuate the latch dogs in proper timed relation.

14. In a nut cracking machine of the rotary drum type, coacting pairs of hammer and anvil plungers; cam means for actuating the hammer plungers; shafts extending through the outer ends of the plungers and splined thereto; pinions and clutches on the shafts; an arcuate rack engageable with the pinions periodically to rotate them; screw portions on the plungers; latch dogs engageable with the screw portions to advance the plungers; a cam to actuate the latch dogs in proper timed relation; and a plunger retracting cam engageable with the plungers adjacent to their outer ends.

15. In a nut cracking machine of the rotary drum type, coacting pairs of hammer and anvil plungers; cam means for actuating the hammer plungers; shafts extending through the outer ends of the anvil plungers and splined thereto; pinions and clutches on the shafts; an arcuate rack engageable with the pinions periodically to rotate them; a cam engageable with the plungers to retract them; fiber bumpers on the plungers to strike the cam; springs initially to advance the plungers when they are released by the retracting cam; screw-threaded sleeves on the plungers; spring urged, latch dogs engageable with the sleeves to further advance the plungers as they are rotated by the plunger driving mechanism and a cam for actuating the latch dogs.

16. In a nut cracking machine of the rotary drum type, a plurality of pairs of coacting hammer and anvil plungers; cam means for operating the hammer plungers; means for periodically rotating the anvil plungers; screw threaded portions on the anvil plungers; and latch dogs engageable with the screw threads to advance the plungers to grip the nuts when the plungers are being rotated.

17. In a nut cracking machine of the rotary drum type, coacting pairs of hammer and anvil plungers; cam means to actuate said hammer plungers; said anvil plungers each having a tubular shell; an ejector pin projecting through and non-rotatably mounted in the shell and terminating in a shaft beyond the outer end thereof, a web rotatable with the drum and having a bearing for the shaft; a pinion loosely mounted on the shaft; a friction clutch connection between the pinion and said shaft; an arcuate rack for periodically driving said pinion, a threaded sleeve fixed on the tubular shell; a splined connection between the shell and said shaft permitting relative sliding movement, an expansible spring on the ejector pin normally urging the plunger inwardly; a fixed cam engageable with the plunger to retract it; pivoted latch dogs engageable with the screw threaded sleeve to advance the plunger; and a cam for operating the latch dogs, whereby, after the plungers are released by the retracting cam, they will be advanced by the latch dogs and the pinions to grip the nuts with uniform pressure.

18. A nut cracking machine of the character described comprising, in combination a plurality of pairs of coacting plungers each having a tubular shell; and ejector pins within the plungers; said tubular shells having openings through their walls for the dust to escape.

19. A nut cracking machine comprising, in combination, a support; a fixed shaft on the support; a rotary drum mounted on the shaft; nut receiving pockets in the drum; coacting hammer and anvil plungers projecting into opposite ends of the pockets and rotatable with the drum; cam means to actuate the hammer plungers; spaced rotatable webs on the shaft carrying the anvil plungers; shafts projecting from the outer ends of the anvil plungers through bearings in the outer one of said webs; pinions on the shafts; an arcuate spring urged rack pivoted to the face of one end support and engageable with the pinions; screw threads on the anvil plungers adjacent to the inner web; spring urged latch dogs pivotally mounted on said inner web; a fixed cam to actuate the latch dogs to advance the hammer plungers so that they will grip the nuts fed in the pockets; a plunger retracting cam fixed on the shaft; and end flanges on the plungers having ring bumpers adapted to cushion the blow of the anvil plungers when they strike the face of the adjacent web while the nut pockets are empty.

20. In a nut cracking machine of the rotary drum type, pairs of hammer and anvil plungers; an adjustable cracking wheel in the path of the hammer plungers to vary the stroke thereof; and adjustable friction clutch driving means for the anvil plungers connected to cause them to grip nuts with uniform pressure before they are fractured by the hammer plungers.

In testimony, that I claim the foregoing as my own, I have hereto affixed my signature.

WILLIAM GEBHARDT.